(12) United States Patent
Bevilacqua et al.

(10) Patent No.: US 11,338,362 B2
(45) Date of Patent: May 24, 2022

(54) MELTING APPARATUS FOR THE PRODUCTION OF STEEL

(71) Applicant: DANIELI & C. OFFICINE MECCANICHE S.P.A., Buttrio (IT)

(72) Inventors: Massimo Bevilacqua, Mossa (IT); Arrigo Bertolissio, Udine (IT)

(73) Assignee: DANIELI & C. OFFICINE MECCANICHE S.P.A., Buttrio (IT)

( * ) Notice: Subject to any disclaimer, the term of this patent is extended or adjusted under 35 U.S.C. 154(b) by 46 days.

(21) Appl. No.: 16/627,273

(22) PCT Filed: Jun. 25, 2018

(86) PCT No.: PCT/IT2018/050114
§ 371 (c)(1),
(2) Date: Dec. 27, 2019

(87) PCT Pub. No.: WO2019/003255
PCT Pub. Date: Jan. 3, 2019

(65) Prior Publication Data
US 2020/0164433 A1    May 28, 2020

(30) Foreign Application Priority Data
Jun. 29, 2017   (IT) .......................... 102017000072859

(51) Int. Cl.
*B22D 45/00*    (2006.01)
*B08B 15/04*    (2006.01)
(Continued)

(52) U.S. Cl.
CPC ............ *B22D 45/005* (2013.01); *B08B 15/02* (2013.01); *B08B 15/04* (2013.01); *C21C 5/40* (2013.01);
(Continued)

(58) Field of Classification Search
CPC ....... B08B 15/02; B08B 15/04; B22D 45/005; C21C 2100/00; C21C 5/40; F27B 3/12;
(Continued)

(56) References Cited

U.S. PATENT DOCUMENTS 3,979,551 A * 9/1976 Overmyer ................. F27D 3/18
373/9
4,477,910 A   10/1984 Nijhawan et al.
(Continued)

FOREIGN PATENT DOCUMENTS

DE       3805226 A1    8/1989
DE      40 37 794 A1   6/1992
(Continued)

OTHER PUBLICATIONS

International Search Report and Written Opinion for PCT/IT2018/050114, dated Sep. 19, 2018.

*Primary Examiner* — Scott R Kastler
*Assistant Examiner* — Michael Aboagye
(74) *Attorney, Agent, or Firm* — Marshall, Gerstein & Borun LLP

(57) ABSTRACT

A melting apparatus for steel production includes a support structure to support a shell for the production and tapping of steel, and a source or zone for the emission of fumes resulting from the tapping of the steel from the shell. The melting apparatus also includes a tapping hood integrated into the support structure and provided with a suction mouth positioned directly above the zone for the emission of fumes, the shell is provided with a bottom wall in which an E.B.T. is provided for tapping the steel.

9 Claims, 2 Drawing Sheets

(51) Int. Cl.
  *F27D 17/00*    (2006.01)
  *F27B 3/19*     (2006.01)
  *F27B 3/12*     (2006.01)
  *B08B 15/02*    (2006.01)
  *C21C 5/40*     (2006.01)

(52) U.S. Cl.
  CPC ............ *F27B 3/12* (2013.01); *F27B 3/19* (2013.01); *F27D 17/002* (2013.01); *F27D 17/003* (2013.01); *C21C 2100/00* (2013.01)

(58) Field of Classification Search
  CPC ........ F27B 3/19; F27D 17/001; F27D 17/002; F27D 17/003
  USPC .............................. 266/158, 159; 454/65, 67
  See application file for complete search history.

(56) References Cited

U.S. PATENT DOCUMENTS

| | | | | |
|---|---|---|---|---|
| 4,786,250 | A * | 11/1988 | Cooper | C21B 7/14 |
| | | | | 266/158 |
| 5,987,051 | A | 11/1999 | Peters | |
| 6,299,830 | B2 * | 10/2001 | Raivo | C21C 5/5205 |
| | | | | 266/272 |
| 6,490,312 | B1 | 12/2002 | Pleschiutschnigg et al. | |
| 9,618,265 | B2 * | 4/2017 | Kemeny | F27B 3/19 |
| 2003/0122290 | A1 | 7/2003 | Wunsche | |

FOREIGN PATENT DOCUMENTS

| | | |
|---|---|---|
| DE | 4103122 A1 | 8/1992 |
| WO | WO-2011/147006 A1 | 12/2011 |

\* cited by examiner

MELTING APPARATUS FOR THE PRODUCTION OF STEEL

FIELD OF THE INVENTION

The present invention concerns a melting apparatus for the production of steel, for example an electric arc furnace provided with at least one fume tapping hood located in a zone of the melting apparatus dedicated to the tapping of the steel.

BACKGROUND OF THE INVENTION

As is known, melting apparatuses, such as in particular electric arc furnaces, are generally used in metallurgy for the production of steel, starting, for example, from scrap, DRI (direct reduced iron), briquettes, cast iron, or suchlike.

The electric arc furnaces can be mainly of two types, alternating current or direct current, and can typically provide a spout-type tapping system.

Some known apparatuses for melting and producing steel, in particular electric arc or induction furnaces, are described for example in documents DE-A-3805226, FR-A-3354768 and DE-A-4103122.

In electric arc furnaces it is possible to distinguish substantially three operating steps: the charging step, the melting and refining step and the tapping step.

From the point of view of the treatment of polluting emissions, one of the most critical steps is the steel tapping step, in which it must be guaranteed that the emissions or fumes produced during the pouring of the steel are correctly captured, sent to a treatment plant and discharged.

Currently the emissions produced during the tapping step are substantially managed in two ways: suction of the fumes by the main hood of the melting apparatus; or suction of the fumes by means of a dedicated hood localized in the tapping zone.

The use of the main hood proves to be quite effective if the hood is compartmentalized inside, however the use of the main hood can present several disadvantages in the event of possible external actions, such as the presence of air currents inside the building where the melting apparatus is housed, which can be generated, for example, by heat sources, the movement of machines, the movement of materials, or other.

Localized tapping hoods are instead positioned in proximity to the melting apparatus, but laterally to the tapping zone or to the zone where the fumes are emitted, therefore they do not guarantee an effective and complete suction of the fumes coming from the aperture through which the steel exits from the shell, nor do they guarantee the correct capture of the fumes that rise from the ladle where the tapped steel is poured.

Other problems of known suction systems also concern the convergence of the suction line from the main hood of the furnace with the suction line of the fumes coming from the tapping zone, and therefore the delivery of the fumes to a single conveyor collector, with obvious disadvantages in the management of the emissions both from the main furnace and from the tapping zone.

Other disadvantages of known melting apparatuses are linked to the fact that it is necessary to provide fume treatment plants which generally require high power, entail high energy expenditure and often large bulk, with negative consequences with regard to the costs and overall size of the melting apparatus or plant. These disadvantages are particularly relevant in melting apparatuses with continuous charging of the furnace, in which, therefore, the sizing of the fume treatment plant is generally calibrated for the tapping step.

Also the melting apparatuses known and described for example in the documents DE-A-3805226, FR-A-3354768 and DE-A-4103122 have the above disadvantages: in particular in the above documents a tapping spout or pipe is used for the passage of the molten steel from the apparatus to a ladle, or suchlike, therefore the liquid steel, during pouring into the ladle, normally remains for a long time and undesirably in contact with the air in an intermediate zone between the melting apparatus and the ladle.

Other limitations and disadvantages of conventional solutions and technologies will be clear to a skilled person after reading the remaining part of the present description with reference to the drawings and the description of the embodiments that follow, although it is clear that the description of the state of the art connected to the present description must not be considered an admission that what is described here is already known from the state of the prior art.

There is therefore a need to perfect a melting apparatus for the production of steel which can overcome at least one of the disadvantages of the state of the art.

One purpose of the present invention is therefore to provide a melting apparatus for the production of steel which has at least one fume tapping hood which is positioned directly in proximity to the zone or source of fume emission from the tapping zone, so as to intercept directly the fumes or emissions resulting from the tapping of the steel.

Another purpose of the present invention is to provide a melting apparatus provided with a tapping hood which has an optimal efficiency for capturing the fumes and therefore allows to improve the quality of the air inside the building in which the melting apparatus is positioned.

Another purpose of the present invention is to provide a melting apparatus which allows to obtain an important reduction in the dimensions or size of the fume treatment plant, both in terms of power absorbed and installed, and also in terms of energy used, of costs and of sizes of the various pipes, in particular in the case where the melting apparatus is charged continuously.

Another purpose of the present invention is to provide a melting apparatus in which the tapping hood is substantially integrated with the support structure of the apparatus itself.

Another purpose of the present invention is to provide a melting apparatus in which, advantageously, the fume suction line, during the tapping step, is independent, at least in proximity to the melting apparatus, from the main fume suction line and provided for the melting furnace or shell.

Another purpose of the present invention is to provide an efficient tapping hood for a melting apparatus for the production of steel.

The Applicant has devised, tested and embodied the present invention to overcome the shortcomings of the state of the art and to obtain these and other purposes and advantages.

SUMMARY OF THE INVENTION

The present invention is set forth and characterized in the independent claims. While the dependent claims describe other characteristics of the invention or variants to the main inventive idea.

In accordance with the above purposes, a melting apparatus for steel production, according to the invention, comprises a support structure to support a shell for the production and tapping of steel, and a source or zone for the emission of fumes resulting from the tapping of the steel.

According to a first characteristic aspect of the invention, the melting apparatus comprises a tapping hood integrated into the support structure and provided with a suction mouth positioned directly above the zone for the emission of fumes. The shell is provided with a bottom wall in which at least one E.B.T. (Eccentric Bottom Tap-hole) is positioned for the tapping of the steel.

The melting apparatus is thus advantageously provided with an E.B.T. positioned directly above the zone for the emission of fumes on the bottom of the shell, therefore contact of the liquid steel with the air is advantageously limited and the use of another spout or tubular tapping element is avoided.

The shell can also comprise a lateral wall that extends transversely to the bottom wall. The E.B.T. can be made in the connection zone between the bottom wall and the lateral wall.

The E.B.T. for the steel can be positioned inside the tapping hood.

The tapping hood can be positioned directly above a container to collect the tapped steel, for example above a ladle.

The tapping hood can comprise at least one suction pipe connectable to a suction line of the fumes coming from the fume emission zone.

The melting apparatus can comprise a main fume suction line disposed at least near, or above, the shell to suck up fumes exiting from the latter. Moreover, the main fume suction line is independent from the fume suction line from the tapping hood.

The fume suction line can be connectable to the suction pipe of the tapping hood by means of a mobile coupling device.

The support structure of the melting apparatus can comprise at least a mobile platform to support the shell and with which the tapping hood is associated.

The mobile platform can comprise a support beam on which the tapping hood is integrated.

The support beam can have a shape complementary to the shape of the tapping hood.

The tapping hood can be positioned at least partly below the level of the fixed platform situated on the bottom of the melting apparatus.

The invention also concerns a tapping hood for a melting apparatus comprising a suction mouth of the fumes which can be positioned directly above a fume emission zone and configured so as to be integrated with a support structure of the melting apparatus.

These and other aspects, characteristics and advantages of the present disclosure will be better understood with reference to the following description, drawings and attached claims. The drawings, which are integrated and form part of the present description, show some forms of embodiment of the present invention, and together with the description, are intended to describe the principles of the disclosure.

The various aspects and characteristics described in the present description can be applied individually where possible. These individual aspects, for example aspects and characteristics described in the attached dependent claims, can be the object of divisional applications.

It is understood that any aspect or characteristic that is discovered, during the patenting process, to be already known, shall not be claimed and shall be the object of a disclaimer.

BRIEF DESCRIPTION OF THE DRAWINGS

These and other characteristics of the present invention will become apparent from the following description of some embodiments, given as a non-restrictive example with reference to the attached drawings wherein.

To facilitate comprehension, the same reference numbers have been used, where possible, to identify identical common elements in the drawings. It is understood that elements and characteristics of one embodiment can conveniently be incorporated into other embodiments without further clarifications.

DETAILED DESCRIPTION OF SOME EMBODIMENTS

We will now refer in detail to the various embodiments of the present invention, of which one or more examples are shown in the attached drawings. Each example is supplied by way of illustration of the invention and shall not be understood as a limitation thereof. For example, the characteristics shown or described insomuch as they are part of one embodiment can be adopted on, or in association with, other embodiments to produce another embodiment. It is understood that the present invention shall include all such modifications and variants.

Before describing the embodiments, we must also clarify that the present description is not limited in its application to details of the construction and disposition of the components as described in the following description using the attached drawings. The present description can provide other embodiments and can be obtained or executed in various other ways. We must also clarify that the phraseology and terminology used here is for the purposes of description only, and cannot be considered as limitative.

Figure 1:
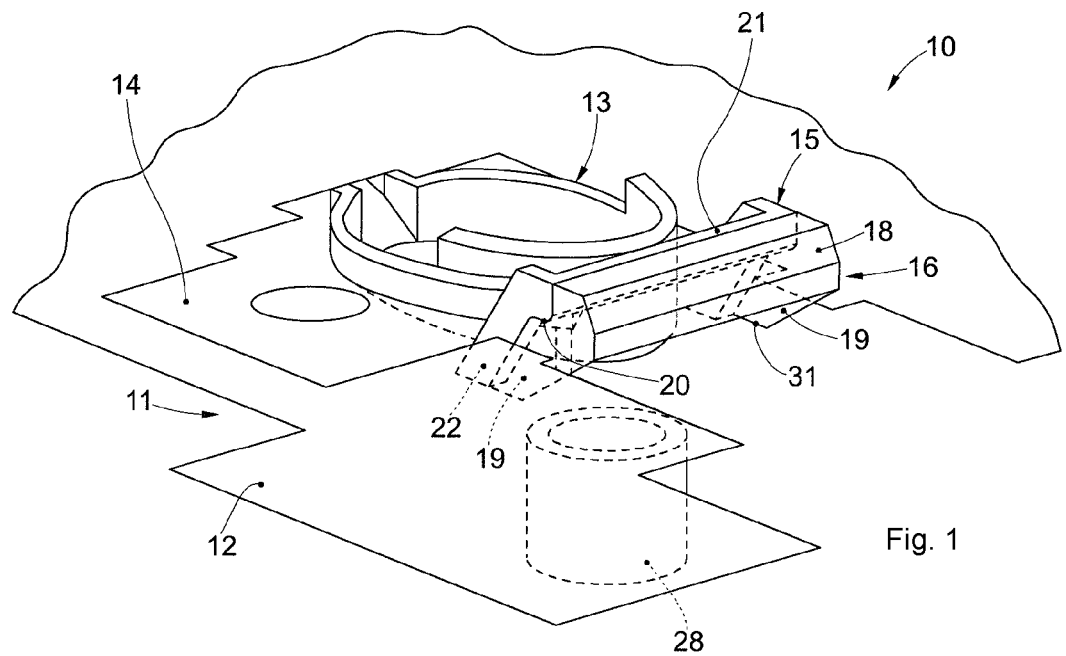
FIG. 1 is a schematic three-dimensional view of a melting apparatus according to the present invention.
Figure 3:
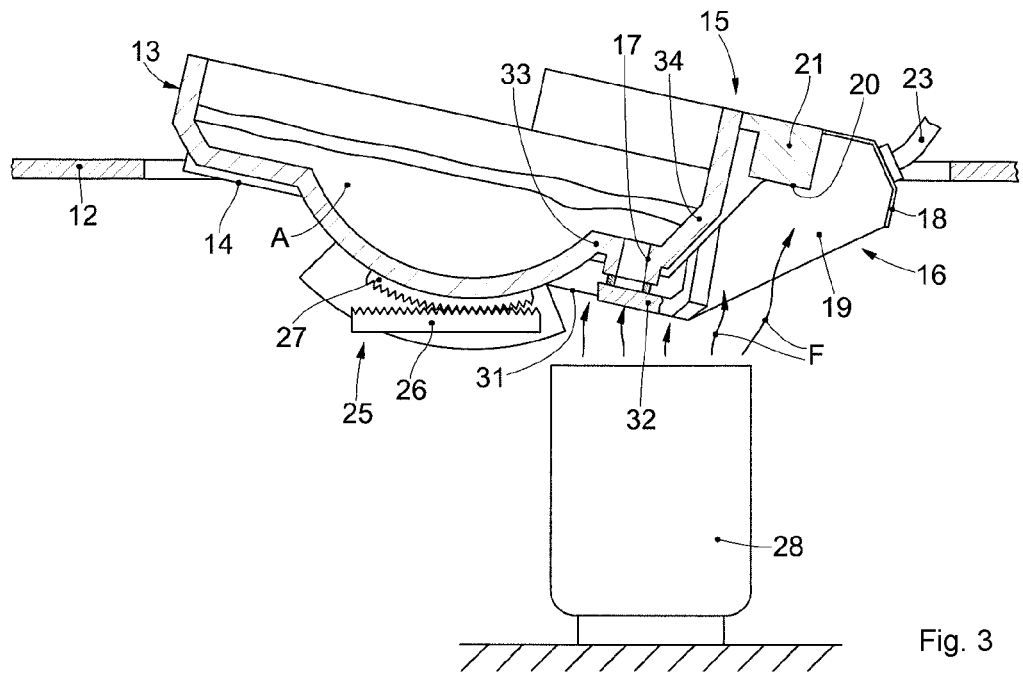
FIG. 3 is a schematic view in lateral elevation and in longitudinal section of the present melting apparatus.

With reference to the attached drawings, a melting apparatus 10 according to the invention comprises a support structure 11 for a shell 13 for melting and producing steel A, see for example FIG. 1 and FIG. 3.

As mentioned in the introduction, the melting apparatus 10 can be, for example, an electric arc furnace.

In the support structure 11, a first fixed platform 12, also called "plancher", and a second mobile platform 14 on which the shell 13 is positioned can be schematically identified.

The fixed platform 12 and the mobile platform 14 therefore substantially form the bottom of the melting apparatus 10.

The mobile platform 14 supports a support beam 15, to which a tapping hood 16, able to suck in the fumes F, is connected by means of any suitable connection mean whatsoever.

In correspondence with the bottom, the melting apparatus has at least one E.B.T. (Eccentric Bottom Tap-hole) 17 to tap the steel, and which is opened or closed by means of a removable stopper 32.

The E.B.T. 17 is provided in correspondence with a bottom wall 33 of the shell 13, see FIG. 3, and for example in correspondence with a peripheral zone of the latter. By way of example only, it can be provided that the shell 13 also comprises a lateral wall 34 which extends transversely to the bottom wall 33, and that the E.B.T. 17 can be made in the connection zone between the bottom wall 33 and the lateral wall 34.

The E.B.T. 17 substantially defines a tapping zone of the melting apparatus 10, below which a container, for example a ladle 28, can be positioned to collect the steel A tapped from the shell 13.

In this way, advantageously, in addition to avoiding the use of a further tapping spout, the contact of the liquid steel with the air is limited, since the E.B.T. 17 is positioned directly above the ladle 28 and on the bottom wall 33 of the shell 13.

The ladle 28, therefore, substantially represents a zone or source of emission of the fumes F, which have to be sucked in by the tapping hood 16. The source or zone of emission of the fumes F can also comprise the E.B.T. 17 itself, for tapping the steel A.

The tapping hood 16 is therefore completely integrated into the support structure 11 of the melting apparatus 10, in particular into the mobile platform 14 which supports the shell 13.

The tapping hood 16 could also be integrated in a different zone of the support structure 11 from the mobile platform 14, provided that the E.B.T. 17 is substantially positioned inside it or provided that the E.B.T. 17 is located directly under the tapping hood 16.

The E.B.T. 17 for tapping the steel is therefore substantially located inside the tapping hood 16.

Alternatively, the E.B.T. 17 could be located in a zone below the tapping hood 16.

The tapping hood 16 has a substantially hollow structure and comprises at least a first upper wall 18, for example with an arched shape, and a pair of opposite lateral walls 19.

In the lower zone defined by the walls 18 and 19, a suction mouth 31 is therefore made, which substantially occupies the lower surface of the tapping hood 16.

The support beam 15 has a shape substantially complementary to the shape of the tapping hood 16, so that the tapping hood 16 can be perfectly integrated with the support structure 11 of the melting apparatus 10.

To this end, for example, the lateral walls 19 can have a hollow 20 which is engaged by an upper portion 21 of the support beam 15.

Naturally, the complementary nature of the support beam 15 with the tapping hood 16 could be obtained in other ways, so that the tapping hood 16 and the support beam 15 are suitably integrated.

The support beam 15 also comprises two lateral walls 22 able to be positioned adjacent to the lateral walls 19 of the tapping hood.

The tapping hood 16 comprises a fume discharge pipe 23, which can be located on the upper wall 18, or even on at least one of the lateral walls 19.

Figure 4:
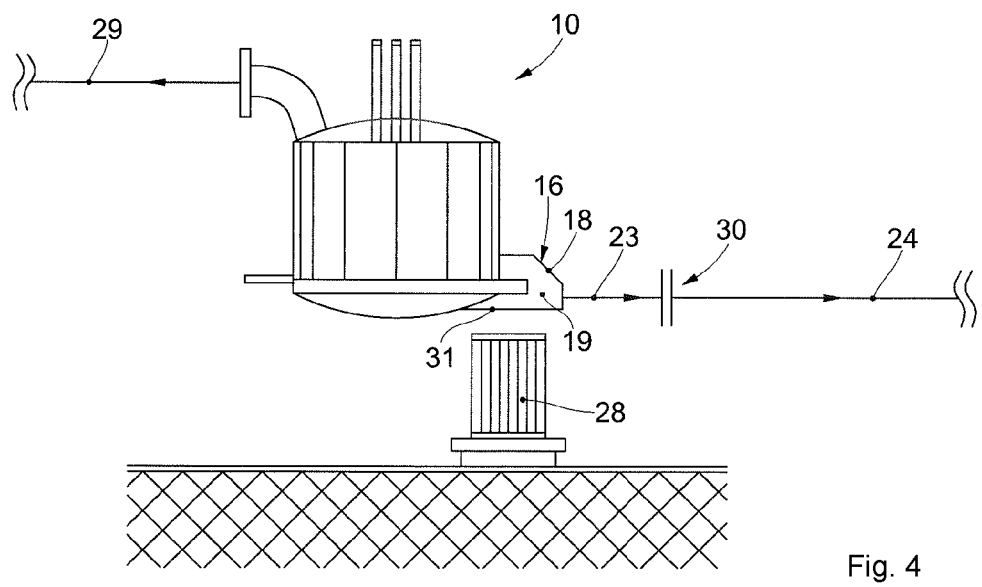
FIG. 4 is a schematic view of the present melting apparatus with independent suction lines of the fumes.

The discharge pipe 23 will be connected to a fume suction line 24 which can convey the fumes to a treatment plant, see the diagram in FIG. 4.

As we said, the support beam 15 is integral with the mobile platform 14 and can be raised to a certain height with respect to it.

Figure 2:
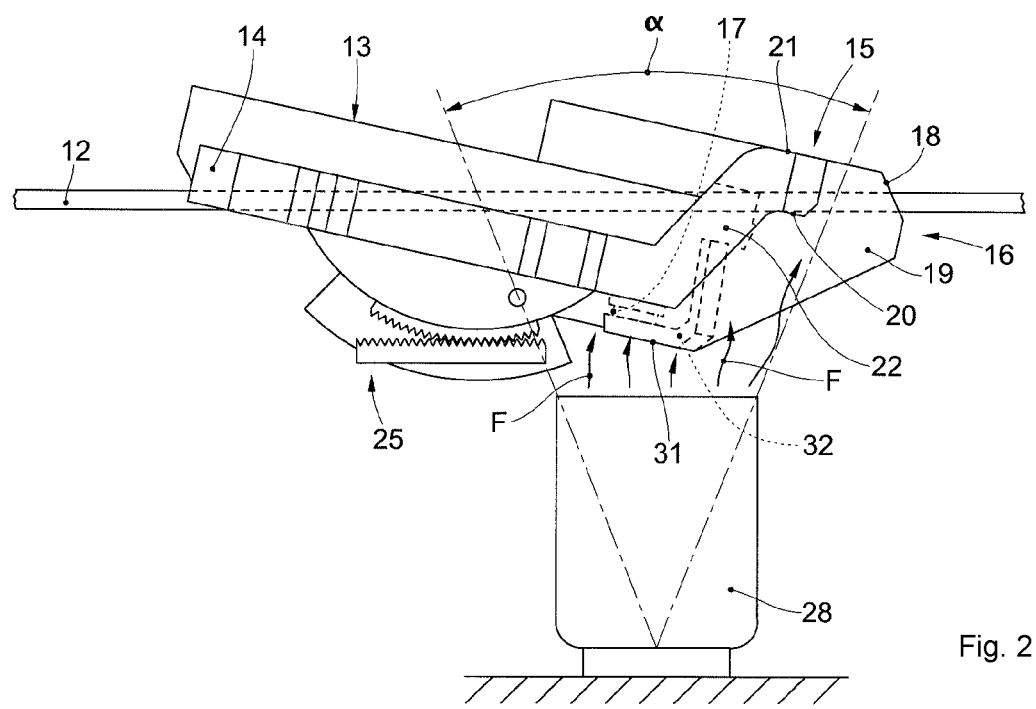
FIG. 2 is a schematic view in lateral elevation of the melting apparatus of FIG. 1.

The mobile platform 14 is connected to the support structure 11 by means of a roto-translation device 25, for example a rack device as shown in FIGS. 2 and 3.

The roto-translation device 25 can comprise a fixed part 26 and a mobile part 27, integral with the mobile platform 14 and therefore with the shell 13.

As is known per se, the purpose of the roto-translation device 25 is to suitably incline the shell 13 and allow the discharge of the steel A from the shell 13 into the ladle 28.

The fumes F, in the tapping zone substantially represented by the E.B.T. 17, can be produced both by the steel A during its passage from the shell 13 to the ladle 28, and also by the steel present in the ladle itself, as shown schematically in FIGS. 2 and 3.

Thanks to the wide suction mouth 31 of the tapping hood 16 and its position integrated in the support structure 11 and in close proximity to the E.B.T. 17, it is possible to intercept most of the emissions or fumes F coming from the ladle 28.

Indeed, advantageously, the present tapping hood 16 has an extension and positioning such as to contain the angle α typical of the expansion of pollutants, also called "plume cone".

The angle α of expansion of the pollutants can be equal, for example, to about 50°.

The melting apparatus 10 is also provided with a main suction line 29 for the fumes.

In accordance with possible embodiments, the main fume suction line 29 can be positioned above the shell 13 to capture the emissions that are emitted during the melting processes.

In accordance with possible solutions, the main fume suction line 29 can be positioned in the installation zone of the melting apparatus 10 in order to suck in the fumes generated by the melting process.

As can be appreciated from the schematic drawing of FIG. 4, the line 29 to suck up fumes from the melting apparatus 10 and the line 24 to suck up fumes from the tapping hood 16 are, advantageously, independent suction lines.

The two suction lines 29 and 24, together with a possible secondary suction line coming from the main hood of the melting apparatus 10, can be connected to a common suction pipe advantageously situated not in proximity to the melting apparatus 10, and therefore not "on board".

The tapping hood 16, then, in the example shown, performs a roto-translation in a manner integral with the shell 13 and the corresponding mobile support platform 14, on which the support beam 15 is provided.

The tapping hood 16 is therefore mobile and substantially follows the inclination of the E.B.T. 17 for tapping the steel A, in order to adapt perfectly to any tapping situation.

To allow such operating flexibility, that is, the roto-translation of the tapping hood 16, between the fumes suction line 24 and the discharge pipe 23, a mobile coupling device 30 can be provided, to couple the suction line 24 with the pipe 23.

The coupling device 30 can provide for example the use of suitably shaped and reciprocally distanced flanges, so as to guarantee an effective depression in the tapping hood 16 and to prevent undesired and excessive input of false air.

The melting apparatus 10 shown therefore has a tapping hood 16 which is advantageously in proximity to the emission source or zone of the fumes F, for example the ladle 28, and advantageously allows the direct interception of the fumes F.

The proximity of the tapping hood 16 to the emission source or zone allows, given the same suction flow rate, to create a significant range of speeds necessary to capture the pollutants. The increase in the capturing speed translates into an increase in the overall efficiency of the discharge system.

The direct interception of the flow is very important in cases where the source is characterized by significant emission speeds and/or significant thermal fields. The latter, in fact, induce high upthrust forces that are difficult to manage through interception positions lateral to the source, as in known hoods.

The tapping hood 16, which is positioned in proximity to the source and directly intercepts the flow of fumes or emissions, allows to significantly optimize the effectiveness and efficiency of the melting apparatus 10 with regard to the capture of the fumes or emissions, particularly during the tapping step.

As can be seen, furthermore, the tapping hood 16 can also be positioned at least partly below the level of the fixed platform 12 situated on the bottom of the melting apparatus 10, so as to move even closer to the ladle 28 for collecting the steel tapped from the shell 13, see for example FIG. 2 or FIG. 3.

As mentioned, moreover, the use of the tapping hood 16 allows to reduce the overall size of the fume treatment plant provided downstream of the melting apparatus 10, both in terms of power absorbed, energy used and the sizes of the pipes of the fume treatment plant, especially if the melting apparatus 10 is the endless charging system type.

As can also be seen from the attached drawings, the support structure 11 itself forms part of the tapping hood 16, through, for example but not restrictively, the support beam 15 integral with the mobile platform 14 and a lower part of the shell itself.

It is clear that modifications and/or additions of parts can be made to the melting apparatus as described heretofore, without departing from the field and scope of the present invention.

It is also clear that, although the present invention has been described with reference to some specific examples, a person of skill in the art shall certainly be able to achieve many other equivalent forms of melting apparatus, having the characteristics as set forth in the claims and hence all coming within the field of protection defined thereby.

In the following claims, the sole purpose of the references in brackets is to facilitate reading: they must not be considered as restrictive factors with regard to the field of protection claimed in the specific claims.

The invention claimed is:

1. A melting apparatus for steel production, the melting apparatus comprising:
   a support structure to support a shell for the production and tapping of steel, and a source or zone for an emission of fumes resulting from the tapping of the steel from said shell;
   a tapping hood integrated into the support structure and provided with a suction mouth positioned directly above the source or zone for the emission of fumes, said shell being provided with a bottom wall in which an E.B.T. (Eccentric Bottom Tap-hole) for tapping the steel is positioned inside said tapping hood,
   wherein said shell comprises a lateral wall that extends transversely to the bottom wall,
   wherein said E.B.T. (Eccentric Bottom Tap-hole) is located in a connection zone between said bottom wall and said lateral wall, and
   wherein said tapping hood is positioned directly above a container to collect the tapped steel.

2. The melting apparatus as in claim 1, wherein said tapping hood comprises at least one suction pipe connectable to a suction line of the fumes coming from the fume emission zone.

3. The melting apparatus as in claim 2, comprising a main fume suction line disposed at least near said shell to suck up the fumes exiting from the latter, said main fume suction line being independent from the fume suction line from said tapping hood.

4. The melting apparatus as in claim 2, wherein said fume suction line is connectable to the suction pipe of said tapping hood by means of a mobile coupling device.

5. The melting apparatus as in claim 1, wherein said support structure comprises at least a mobile platform to support the shell and with which said tapping hood is associated.

6. The melting apparatus as in claim 5, wherein said mobile platform comprises a support beam on which said tapping hood is integrated.

7. The melting apparatus as in claim 6, wherein said support beam has a shape complementary to the shape of the tapping hood.

8. The melting apparatus as in claim 1, wherein said tapping hood is positioned at least partly below a level of a fixed platform, the fixed platform forming the base of the melting apparatus.

9. The melting apparatus as in claim 1, wherein the tapping hood further comprises a suction mouth for receiving fumes positioned directly above a fume emission zone and configured to be integrated with a support structure of the melting apparatus, wherein said tapping hood further comprises an E.B.T. (Eccentric Bottom Tap-hole) positioned therein, said tapping hood having a hollow structure and at least a first upper wall and a pair of opposite lateral walls, wherein said suction mouth is made in a lower zone defined by said walls and occupies a lower surface of the tapping hood.

* * * * *